US007685471B2

(12) United States Patent
Rajan et al.

(10) Patent No.: US 7,685,471 B2
(45) Date of Patent: Mar. 23, 2010

(54) SYSTEM AND METHOD FOR DETECTING SOFTWARE DEFECTS

(75) Inventors: Sreeranga P. Rajan, Sunnyvale, CA (US); Oksana Tkachuk, Palo Alto, CA (US); Mukul R. Prasad, San Jose, CA (US); Indradeep Ghosh, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 469 days.

(21) Appl. No.: 11/670,143

(22) Filed: Feb. 1, 2007

(65) Prior Publication Data

US 2008/0189686 A1 Aug. 7, 2008

(51) Int. Cl.
*G06F 11/00* (2006.01)

(52) U.S. Cl. .......................... 714/38; 717/124; 717/126

(58) Field of Classification Search .................. 714/38; 717/124, 126
See application file for complete search history.

(56) References Cited

U.S. PATENT DOCUMENTS 7,047,523 B1 * 5/2006 Liggesmeyer ............... 717/132
7,257,804 B2 * 8/2007 Baecker et al. .............. 717/124
7,346,486 B2 * 3/2008 Ivancic et al. ................. 703/22
7,490,268 B2 * 2/2009 Keromytis et al. ............ 714/38
7,493,597 B2 * 2/2009 Hefner ....................... 717/124
2006/0010428 A1 * 1/2006 Rushby et al. ............. 717/124
2006/0190771 A1 * 8/2006 Hefner ........................ 714/38

OTHER PUBLICATIONS

Corbett et al. "Bandera: extracting finite-state models from Java source code." Proc. of 2000 Intl. Conf. on Software Engineering. Jun. 4-11, 2000. Published Aug. 6, 2002.*

Hughes, et al., *Error Detection in Concurrent Java Programs* (10 pages).

Tkachuk, et al., *Application of Automated Environment Generation to Commercial Software* (11 pages).

* cited by examiner

*Primary Examiner*—Philip Guyton
(74) *Attorney, Agent, or Firm*—Baker Botts L.L.P.

(57) ABSTRACT

A method for detecting software defects includes selecting from a target program comprising a plurality of modules a first module for evaluation and isolating the first module. The method also includes iteratively performing the following steps until the first module has been reduced such that a validation program is able to determine whether the first module contains a defect: generating an environment surrounding the first module, the generated environment preserving at least one external constraint on the first module; reducing the size of the first module; and reducing the number of program states associated with the first module.

16 Claims, 2 Drawing Sheets

START
310 RUN TARGET PROGRAM
320 DETECT ERROR
330 IDENTIFY MODULES THAT COULD CAUSE THE ERROR
340 SELECT FIRST MODULE FOR EVALUATION
350 ISOLATE FIRST MODULE
360 GENERATE ENVIRONMENT SURROUNDING FIRST MODULE
370 REDUCE SIZE OF FIRST MODULE
380 REDUCE NUMBER OF PROGRAM STATES ASSOCIATED WITH FIRST MODULE
390 CAN VALIDATION PROGRAM DETERMINE WHETHER THE FIRST MODULE CONTAINS A DEFECT ?
NO
YES
END

SYSTEM AND METHOD FOR DETECTING SOFTWARE DEFECTS

TECHNICAL FIELD OF THE INVENTION

This invention relates in general to software diagnostics and, more particularly, to a system and method for detecting software defects.

BACKGROUND OF THE INVENTION

As software projects grow larger and more complex, techniques for detecting errors in them become more important. A common technique for detecting errors in large commercial systems is through the use of test cases. However, creating good test cases is very difficult, and testing for concurrency errors (errors caused by more than one process or thread being run at the same time) can be extremely frustrating.

There are several different techniques available for diagnosing software. One such technique, model checking, involves algorithmically checking whether a program (the model) satisfies a specification. The model reflects the functional or operational requirements that the program being tested is trying to address. Then test cases, sometimes generated semi-automatically based on scenarios that the program may be involved in, are supplied to the model checker. The model checker then applies the test case to the model and generates the result. Unfortunately model checking tools face a combinational blow up of the state-space, commonly known as the state explosion problem that may require more time or computational power/resources than may be available. For example, when testing a large program (30,000 or more lines) using a model checker the model checker may run out of memory or run out of time before it is able to complete the testing.

Sometimes various metric tools are also used to evaluate the results of the test cases. The test cases may simulate different scenarios but they often are not able to explore all possible situations that a program may encounter. Other attempted solutions include static analysis and run time monitoring but, like a model checker, these techniques are not able to detect every defect in large software systems in an efficient manner. This may be because of one of two reasons, either the technique is not able to reduce the software system being tested to a sufficiently reduce size, or the technique is too aggressive in reducing the size of the software system masking some of the bugs.

Some of the different reduction techniques are environment generation, slicing, and abstraction. In environment generation external constraints to a particular portion of the software are maintained; in slicing the portions of the software that are of interest or related to a particular part of the software are identified; and in abstraction the number of program states associated with the software is reduced.

SUMMARY

Particular embodiments provide a system and method for detecting software defects that substantially eliminates or reduces at least some of the disadvantages and problems associated with previous methods and systems.

In accordance with a particular embodiment, a method for detecting software defects includes selecting from a target program comprising a plurality of modules a first module for evaluation and isolating the first module. The method also includes iteratively performing the following steps until the first module has been reduced such that a validation program is able to determine whether the first module contains a defect: generating an environment surrounding the first module, the generated environment preserving at least one external constraint on the first module; reducing the size of the first module; and reducing the number of program states associated with the first module.

In some embodiments the validation program may comprise a model checker. In particular embodiments reducing the size of the first module may include detecting an error in the target program and identifying a portion of the first module that could cause the error. Reducing the size of the first module may also include slicing the first module so that at least one parameter not related to the portion of the first module that could cause the error is removed from the potentially faulty module. In some embodiments reducing the number of program states associated with the first module may include abstracting the program states associated with the first module.

In accordance with another embodiment a system for detecting software defects includes a processor operable to select from a target program comprising a plurality of modules a first module for evaluation and to isolate the first module. The system also includes an environment generation unit coupled to the processor and operable to generate an environment surrounding the first module. The generated environment preserves at least one external constraint on the first module. The system further includes a size reduction unit coupled to the processor and operable to reduce the size of the first module. The system additionally includes a state reduction unit coupled to the processor and operable to reduce the number of program states associated with the first module. The processor is further operable to iteratively invoke the environment generation unit, the size reduction unit and the state reduction unit until the first module has been reduced such that a validation program is able to determine whether the first module contains a defect.

Technical advantages of particular embodiments include iteratively combining multiple reduction techniques to appropriately reduce the size of the software program being tested. Accordingly, it may be possible to detect defects in large software systems that may not have been found by existing methods.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
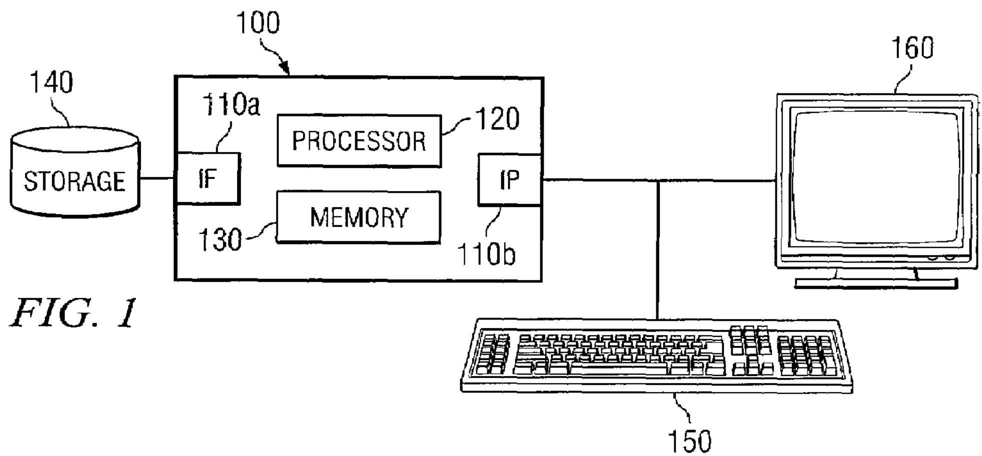
FIG. 1 illustrates a computer operable to detect software defects, in accordance with a particular embodiment.

FIG. 1 illustrates a computer operable to detect software defects, in accordance with a particular embodiment. Computer 100 comprises interfaces 110, processor 120, and memory 130. Coupled to computer 100 via interface 110*a* is storage unit 140 and coupled to computer 100 via interface 110*b* is keyboard 150 and monitor 160. These components may be coupled such that they may be used in conjunction with one another to allow a user, such as a programmer, to detect programming defects within a large (e.g., over 30,000 lines of code) program. The large program may include multiple levels (e.g., a web tier, a business application tier, and a database tier) that the programmer wishes to ensure conforms to the parameters/specifications provided by a customer. The programmer may use computer 100 to test the program before it is shipped to the customer or otherwise made available to the public.

In testing the program, computer 100 may be able to identify/isolate particular areas, sections or modules of a large program that are believed to contain one or more defects that could have caused a particular error. A reduced environment may then be generated around the potentially faulty area or module (hereinafter the "faulty module"). The reduced environment may provide a closed environment around the faulty module allowing it to interact with the reduced environment without having to maintain the entire program. Then slicing may be used to remove any extraneous portions (e.g., portions of the program that are not related to the error) from the faulty module. This may not provide a large reduction in size, but it may be a safe reduction step (e.g., relatively small chance of removing the defect). Next, abstraction may be used to reduce the number of program states associated with the faulty module by combing several program states into a single program state (e.g., combining separate program states for the United States and Canada into a single program state for North America). This can greatly decrease the amount of time needed to process the individual, unabstracted, program states associated with the faulty module by reducing the number of program states that have to be analyzed.

Interfaces 110*a* and 110*b* may be used in the communication of signaling and/or data between computer 100 and external components such as storage unit 140, keyboard 150 and/or monitor 160. For example, interface 110*a* may receive data comprising the source code for a program containing a defect or interface 110*a* may send data comprising the results of the analysis of a particular program. As another example, interface 110*b* may receive user input from keyboard 150 and send data to be displayed on monitored 160. The number and type of interfaces 110 included with computer 100 may be based on the number and type of external components that are to be coupled to computer 100.

Processor 120 may be a microprocessor, controller, or any other suitable computing device, resource, or combination of hardware, software and/or encoded logic operable to provide, either alone or in conjunction with other computer components such as memory 130 and interface 110, computer 100 functionality. Such functionality may include providing various features discussed herein to a user, such as a programmer accessing computer 100 via keyboard 150 and monitor 160. Such features may include providing the user with a graphical user interface which the user may use, in connection with keyboard 150, for configuring computer 100 to analyze a particular program. Computer 100 may then analyze the particular program and detect one or more defects. Then the faulty module containing the defect may be iteratively reduced in size using environment generation, slicing and abstraction. The reduced faulty module is then validated using one or more validation techniques. The results may then be presented to the user via monitor 160 and/or stored within memory 130 and/or storage unit 140.

Memory 130 may be any form of volatile or non-volatile memory including, without limitation, magnetic media, optical media, random access memory (RAM), read-only memory (ROM), removable media, or any other suitable local or remote memory component. Memory 130 may store any suitable data or information, including software and encoded logic, utilized by computer 100. In some embodiments memory 130 may store any information, data, commands or instructions needed by processor 120 to detect defects in a program. Memory 130 may also store the program being analyzed, or some portion thereof, as well as any of the results, either final or intermediary, from the validation program.

Storage unit 140 may comprise any type of storage medium within any type of device capable of storing and communicating data and signaling with computer 100. More specifically, storage unit 140 may be another computer, file-server, external hard drive, or database that comprises any form of volatile or non-volatile memory including, without limitation, magnetic media, optical media, random access memory (RAM), read-only memory (ROM), removable media, or any other suitable local or remote memory or data storage component. Storage unit 140 may be connected directly to computer 100 or it may be coupled to computer 100 via a network, such as a LAN or the internet. Storage unit 140 may be used to store such data as the source code for the program that is to be analyzed by computer 100, the data used by computer 100 in analyzing the program (e.g., an environment generated by processor 120) and/or some combination thereof.

Keyboard 150 and monitor 160 represent any combination of input and output devices that may be employed by computer 100 to facilitate the interaction between a user and computer 100. While FIG. 1 only depicts a keyboard and a monitor, other input devices may include a mouse, a trackball, a touchpad, a touch screen, a keypad, a speech recognition device, or any other device capable of communicating user input to computer 100. Other output devices may include a printer, a fax machine, a loudspeaker, or any other device capable of communicating information to a user.

The following example is presented in order to illustrate how the various components described above may work together in order to provide some of the functionality associated with detecting defects in software. This example does not cover all possible configurations of internal or external components nor does it discuss all possible features and functions associated with detecting software defects. For purposes of this example assume that a programmer is using keyboard 150 to enter data into computer 100 and monitor 160 to view information presented by computer 100. Also assume that the software that is to be analyzed (hereinafter the "test program") is a large program containing over 100,000 lines of code that are stored in storage unit 140. Further assume that any programming, logic, commands and/or instructions needed to analyze the program are stored within memory 130.

The programmer may first use computer 100 to run the test program. In doing so computer 100 may encounter one or more errors, each error may be caused by one or more defects in the test program. Computer 100 or the programmer may be able to determine and/or gather information about the architecture of the test program and/or the nature of the defect/error. The information may be used to identify one or more modules, such as classes, sections, sub-programs, drivers, libraries, or portions or areas of the test program, that may potentially be causing the defect (e.g., based on the information the programmer may be able to identify three modules that may have caused the error, but only one of them may actually have a defect). For example in some embodiments computer 100 may decompose global properties of the test program into smaller properties which may be cast as assertions that may be inserted into the faulty module. Additional information concerning the defect/error may then be ascertained based on whether or not a particular assertion fails. Information regarding both the faulty module and the defect/error may be used by computer 100 to determine at least one potential cause of the error. More specifically, computer 100 may use processor 120, memory 130 and storage unit 140, to iteratively apply environment generation, slicing and abstraction to reduce the size of the test program. Once the test program has been successfully reduced it may be validated using one or more validation techniques such as static analysis, run time analysis, model checking, theorem proving, standard testing, or any combination of the above or any other validation technique that may be desired.

In order to validate a particular module that has been separated/isolated from the test program, the context of its execution (e.g., its surrounding environment) needs to be preserved. In environment generation, processor 120 may load the test program from storage unit 140 and determine the properties, variables, states, and/or characteristics with which the module may interact. Processor 120 may then create a reduced environment to surround the faulty module. The reduced environment may impose the same external constraints on the faulty module that would have been imposed had the module remained within the test program, but with fewer properties, variables, states, and/or characteristics. Thus, the context of the faulty module's execution is preserved without having to maintain the entire test program. Depending on the embodiment, processor 120 may synthesize the environment from user assumptions and/or it may extract the environment via environment implementation using static analysis techniques. It should be noted that in some embodiments the programmer may himself create the environment using an appropriate approach (e.g., writing the appropriate drivers and/or software using a trial-and-error approach).

Computer 100 may also perform slicing. In slicing, processor 120 may analyze the faulty module to determine which portions of the module may have an effect on the suspected defect in the faulty module. Once these portions of the faulty module have been determined the processor 120 may then reduce the size of the faulty module by removing or ignoring the rest of the faulty module. Depending on the test program this may not result in a very drastic reduction because most of the variables, states and/or properties of a module are often interrelated, and thus most portions of the faulty module will be have an effect on the suspected defect.

Computer 100 may also perform abstraction. In abstraction, processor 120 may attempt to reduce the number of program states associated with the faulty module. For example, if the program states for the test program involve the local time in every city in the continental United States, abstraction may reduce the program states to the local time in each of the four time zones in the continental United States. In order to abstract the number of program states the programmer may use keyboard 150 to enter in information that computer 100 may use during the abstraction process. In some embodiments computer 100 may be able to generate any information it needs during abstraction (e.g., it may look for similarities among several program states).

Computer 100 may then repeat one or more of the three reduction techniques discussed above until the module has been sufficiently reduced to meet certain parameters. These parameters may reflect an estimate of a desired size for the faulty module. The desired size is one that is small enough that computer 100 is able to efficiently run the reduced faulty module through a validation program, yet large enough that the defect has not been removed. Once computer 100 has completed this iterative application of environment generation, slicing, and abstraction, computer 100 may then run a validation program. The validation program, such as a model checker, may be used to determine or identify the defect or to determine that the faulty module does not contain a defect.

If the defect was not identified then it may be that the reduction techniques used by computer 100 were too aggressive (e.g., they removed too much of the test program causing either the defect or a contributing factor to the defect to be removed). In such a situation the programmer may use keyboard 150 and monitor 160 to edit the parameters used by computer 100 during the reduction process so that a less aggressive approach is taken. In some embodiments computer 100 may have stored in memory 130 alternate parameters or an algorithm that may be used to generate parameters for a less aggressive approach to reducing the size of the faulty module. Regardless of how the parameters for reducing the faulty module are generated or received, computer 100 may use processor 120 and memory 130 to re-execute the three reduction techniques in a less aggressive manner to preserve more of the faulty module. More specifically, during environment generation and slicing, processor 120 may attempt to identify more variables, states and/or properties of the test program to include; and during abstraction, processor 120 may attempt to include more program states. For example, during abstraction processor 120 may include a set of variables that were initially ignored; during slicing processor 120 may include system properties that are related to the suspected defect only in a tangential manner; and during abstraction, processor 120 may abstract the local time of each city to the local time for the 48 contiguous states instead of the four time zones.

In some instances the three reduction techniques may not have sufficiently reduced the size of the faulty module. Such instances may be detected, for example, if the validation technique exceeds a certain amount of time or runs out of resources (e.g. memory) before the validation program has finished. For example, where the number of program states grows very rapidly as different combinations are tried (e.g., state explosion), the programmer may instruct computer 100 to reexecute one or more of the reduction technique described above applying a more aggressive reduction approach. In some embodiments computer 100 may reexecute the reduction techniques without input from the programmer.

Although FIG. 1 illustrates a particular number and configuration of internal and external components of a computer used to detect software defects, it should be apparent that a computer contemplates any number or arrangement of such components for use by and/or with a computer.

Figure 2:
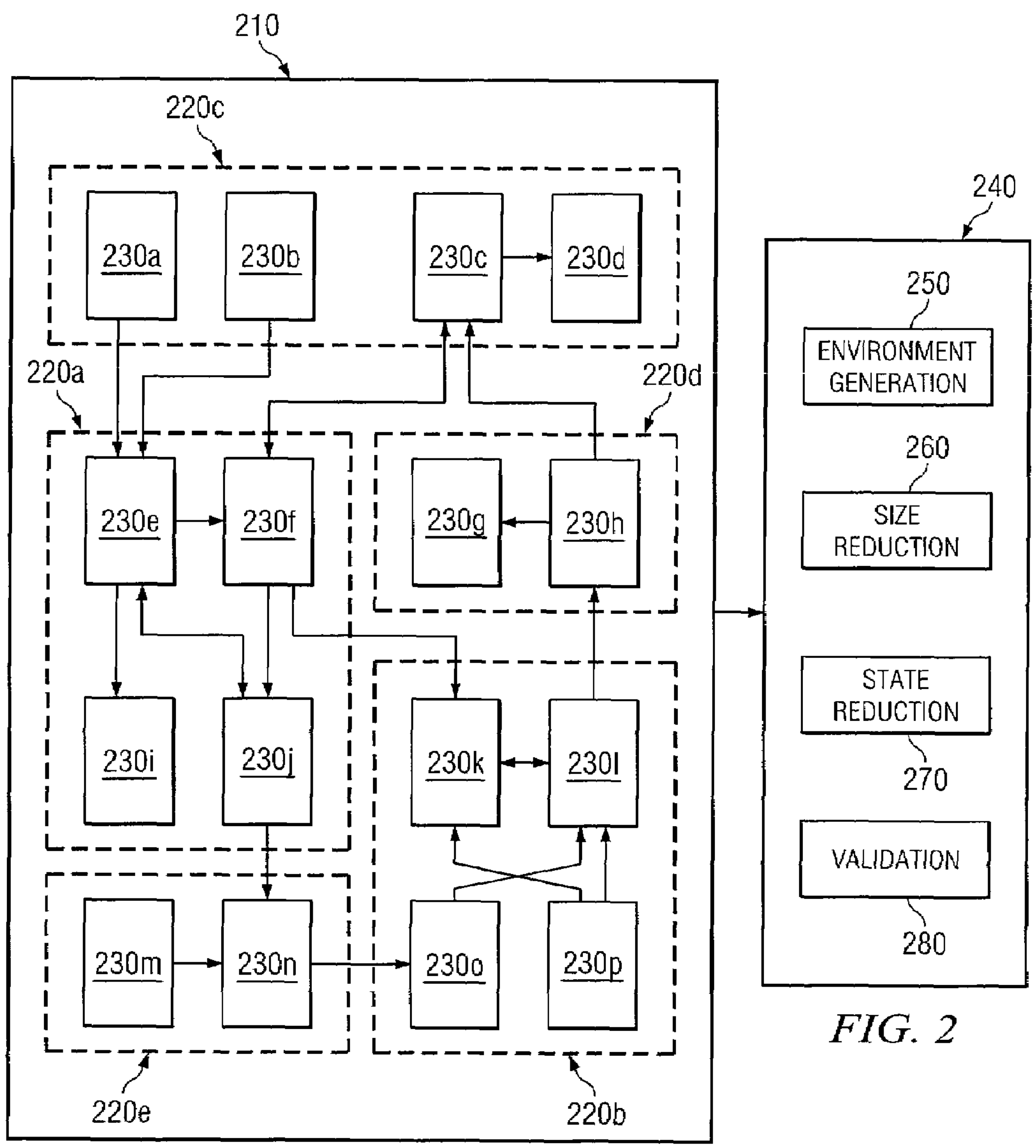
FIG. 2 illustrates a box diagram of an example test program being evaluated, in accordance with a particular embodiment.

FIG. 2 illustrates a box diagram of an example test program being evaluated, in accordance with a particular embodiment. Depending on the functionality, scope and/or design of a test program, the test program may comprise any number of modules and/or stubs. FIG. 2 illustrates a particular test program, test program 210, which comprises five modules 220 and sixteen stubs 230, with modules 220*a*, 220*b*, and 220*c* comprising four stubs apiece, and modules 220*d* and 220*e* comprising two stubs apiece. Each stub 230 may comprise any number of variables, classes, sub-classes, states, tables, loops, data, or any other grouping or collection of lines of code. Evaluation program 240 comprises environment generation unit 250, size reduction unit 260, state reduction unit 270 and validation unit 280. These components may work with one another to detect a defect within test program 210.

Environment generation unit 250, size reduction unit 260, state reduction unit 270 and validation unit 280 may comprise any collection and/or arrangement of processors, memory modules, interfaces and/or other hardware that may be needed in order to perform the unit's respective functionality, such as the functionality described below. These units may be located within a single computer, such as computer 100 depicted in FIG. 1, or spread out among multiple, interconnected, computers or other hardware. Furthermore, each unit may have its own separate set of resources that it uses in performing its respective task, or one ore more of the resources may be shared with other units. For example, all four units may share a single processor that may also coordinate when each unit is invoked.

In order to illustrate an example of how these units work, assume that it has been determined that test program 210 contains an error. Further assume that a programmer has been able to determine that the error is likely caused by a defect in a stub within module 220*a* or 220*b*. Accordingly, the programmer has chosen to begin with module 220*a*.

Environment generation unit 250 may begin by determining with which stubs 230 module 220*a* interacts. For example, module 220*a* interacts with stubs 230*a*, 230*b*, 230*c*, 230*k*, and 230*n*. These stubs 230 may be used in generating the reduced environment for analyzing module 220*a*. In this example it may be assumed that the programmer knows if module 220*a* contains a defect it would likely be in stub 230*f*. This information may be provided to evaluation program 240 for use by size reduction unit 260. In some embodiments size reduction unit 260 may comprise a slicer program which may identify those portions of a module that are related to a particular stub, variable, state or other module parameter. For example, size reduction unit 260 may use the information provided to evaluation program 240 to remove stub 230*i* because it is not directly related to stub 230*f* (e.g., it does not pass or receive information to or from stub 230*f*). Evaluation program 240 may also provide state reduction unit 270 with information that state reduction unit 270 may use to reduce the number of program states that may be applied to module 220*a*. For example, in an embodiment in which state reduction unit 270 comprises an abstraction program, state reduction unit 270 may reduce the number of program states via abstraction, as described above with respect to FIG. 1. These three units may be reexecuted as many times as needed. For example, in some embodiments evaluation program 240 may have certain parameters that module 220*a* must meet before validation unit 280 will be allowed to attempt to validate module 220*a*. In other embodiments, the programmer may decide whether module 220*a* has been sufficiently reduced to allow it to be passed to validation unit 280.

If validation unit 280 is not able to validate module 220*a* because it has run out of time or resources then either the programmer or evaluation program 240 may decide to have environment generation unit 250, size reduction unit 260, and state reduction unit 270 perform a more aggressive reduction of module 220*a* to reduce the scope of the validation process. For example, environment generation unit 250 may only examine those stubs that provide module 220*a* with data (e.g., stubs 230*a* and 230*b*).

If validation unit 280 is able to complete the validation of module 220*a* but does not find the defect, the programmer or evaluation program 240 may decide whether the defect was not found because the cause of the defect was removed, or because the defect is not in module 220*a*. If it is decided that the defect was removed, then evaluation program 240 may have been too aggressive in running environment generation unit 250, size reduction unit 260, and state reduction unit 270. Accordingly, one or more of these units may be reexecuted to perform a less aggressive reduction. For example, size reduction unit 260 may include stub 230*i*, and/or environment generation unit 250 may include additional stubs, such as stub 230*h*, which may only be tangentially involved with module 220*a*.

If the defect is still not found, the programmer or evaluation program 240 may decide that the defect is not within module 220*a* and that it is now time to analyze module 220*b*. Environment generation unit 250, size reduction unit 260, state reduction unit 270 and validation unit 280 may all perform similarly for module 220*b* as they did for module 220*a*.

Although FIG. 2 illustrates a particular number and configuration of modules, stubs, and evaluation program units, it should be apparent that a test program and/or evaluation program contemplate any number or arrangement of such components for use by and/or with one another.

Figure 3:
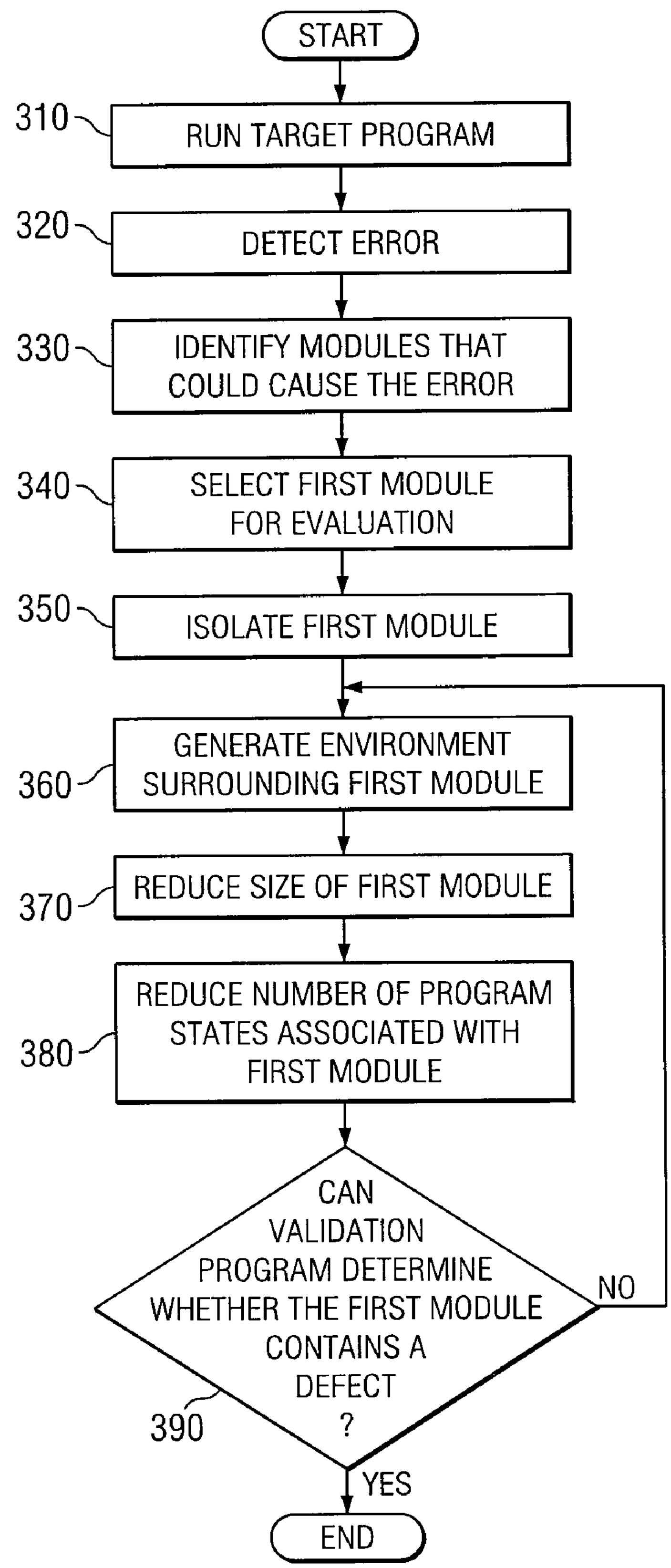
FIG. 3 illustrates a method for detecting software defects, in accordance with a particular embodiment.

FIG. 3 illustrates a method for detecting software defects, in accordance with a particular embodiment. The method begins at step 310 where the target program is run. The target program may, for example, be run on a computer (e.g., computer 100 of FIG. 1) by a programmer developing the target program. The target program may be any program that a user, such as the programmer, wants checked for defects. For example, when developing a program for a client the programmer may wish to identify and correct any defect in the target program that may cause a runtime error before presenting the program to the client.

At step 320 an error is detected. This error may detected by an unexpected result (e.g., the target program displays the current time instead of the current temperature), a system crash or failure, or some other error message. Regardless of the type of error both the programmer and the computer may be able to collect certain information about the error and possible the defect that may have caused the error. This information may then be used at step 330 to identify the modules that could cause the error. For example, in the scenario in which the program displayed the time instead of the temperature, the programmer may be able to ascertain that the defect is in either the module responsible for displaying the temperature or the module responsible for calculating the temperature.

Once the programmer has identified the modules that could of caused the error he may, at step 340, select a first module to be evaluated. Once the module to be evaluated has been identified a computer may begin to analyze that module to detect any defects that may lie therein.

At step 350 the first module may be isolated from the rest of the target program. Then at step 360 an environment may be generated around the now isolated first module. The generated environment may allow the first module to be isolated from the rest of the program while still preserving any variables, data, parameters, constraints, or states that the first module may need. Accordingly, the module is able to perform as though it were still within the target program even though it is only interacting with the smaller generated environment.

At step 370 the size of the module may be reduced. This may involve any type of reduction technique, program or algorithm that may be desired. For example, in some embodiments the size of the first module may be reduced using a slicer. The slicer may identify those portions of the module that relate to either the defect or the error and then remove the rest of the first module. Because the exact cause of the error and the defect are not known the slicer may generally only remove a relatively small portion of the module.

At step 380 the number of program states associated with the first module may be reduced. The way in which the number of program states may be reduced may depend on the type of state, the target program, and the capabilities, resources, and/or programs available on the device analyzing the target program. For example, in some embodiments the number of states may be reduced by using an abstraction program. Other embodiments may involve a user reducing the number of program states applied to the first module.

Once steps 360, 370 and 380 have been performed a validation program, such as a model checker, may attempt to validate the module at step 390. If it successfully identifies the defect (or concludes that there is no defect) then the method ends. If the validation program was not able to identify a defect then steps 360, 370 and 380 may be repeated. In doing so, one or more of the steps may be repeated in a more or less aggressive fashion, depending on the result of the validation program. More specifically, if the validation program runs out of resources before completing the validation process then the steps may be repeated in a more aggressive fashion to reduce the amount of resources needed to validate the first module. If the validation program does not detect a defect because the defect (or its cause) has been removed, then the steps may be repeated in a less aggressive manner to avoid removing the defect (or its cause).

It should be noted that while in the above method some steps were performed by a user while other steps were performed by a computer, any of the steps may include any degree of involvement or input from a user or a computer. Accordingly some of the steps identified as involving user input may be automated and steps that were automated may include user input.

Thus far several different embodiments and features have been presented. Particular embodiments may combine one or more of these features depending on operational needs and/or component limitations. This allows for great adaptability of computer 100 to the needs of various organizations and users. For example, a particular embodiment may use multiple processors to increase the computational power of computer 100.

Some of the steps illustrated in FIG. 3 may be combined, modified or deleted where appropriate, and additional steps may also be added to the flowchart. Additionally, steps may be performed in any suitable order without departing from the scope of the invention.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1, according to operational needs or desires.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within computer 100, these elements may be combined, rearranged or positioned in order to accommodate particular computational needs. In addition, any of these elements may be provided as separate external components to computer 100, or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for detecting software defects, comprising:
- selecting from a target program comprising a plurality of modules a first module for evaluation;
- isolating the first module; and
- iteratively performing the following steps until the first module has been reduced such that a validation program is able to determine whether the first module contains a defect:
  - generating an environment surrounding the first module, the generated environment preserving at least one external constraint on the first module;
  - reducing the size of the first module, wherein reducing the size of the first module comprises:
    - detecting an error in the target program;
    - identifying a portion of the first module that could cause the error; and
    - slicing the first module so that at least one parameter not related to the portion of the first module that could cause the error is removed from the potentially faulty module; and
  - reducing the number of program states associated with the first module.

2. The method of claim 1, wherein selecting from the target program comprising a plurality of modules a first module to be evaluated comprises:
- running the target program;
- detecting at least one error during the running of the program, the at least one error caused by a defect in one or more modules of the plurality of modules;
- identifying the one or more modules of the plurality of modules that could cause the at least one error; and
- selecting a first module from among the one or more modules that could cause the at least one error.

3. The method of claim 1, wherein the validation program comprises a model checker.

4. The method of claim 1, wherein reducing the number of program states associated with the first module comprises abstracting the program states associated with the first module.

5. The method of claim 4:
- further comprising receiving at least one abstraction parameter; and
- wherein abstracting the program states associated with the first module comprises applying the at least one abstraction parameter when abstracting the program states associated with the first module.

6. A system for detecting software defects, comprising:
- a hardware-based processor operable to:
  - select from a target program comprising a plurality of modules a first module for evaluation; and
  - isolate the first module;
- an environment generation unit coupled to the processor and operable to generate an environment surrounding the first module, the generated environment preserving at least one external constraint on the first module;
- a size reduction unit coupled to the processor and operable to reduce the size of the first module; and
- a state reduction unit coupled to the processor and operable to reduce the number of program states associated with the first module; and
- wherein the processor is further operable to iteratively invoke the environment generation unit, the size reduction unit and the state reduction unit until the first module has been reduced such that a validation program is able to determine whether the first module contains a defect; and wherein the processor is further operable to detect an error in the target program and identify a portion of the first module that could cause the error, and wherein the size reduction unit is further operable to reduce the size of the first module comprises a size reduction unit operable to slice the first module so that at least one parameter not related to the portion of the first module that could cause the error is removed from the potentially faulty module.

7. The system of claim 6, wherein the processor operable to select from the target program comprising a plurality of modules a first module to be evaluated comprises a processor operable to:

run the target program;

detect at least one error during the running of the program, the at least one error caused by a defect in one or more modules of the plurality of modules;

identify the one or more modules of the plurality of modules that could cause the at least one error; and select a first module from among the one or more modules that could cause the at least one error.

8. The system of claim 6, wherein the validation program comprises a model checker.

9. The system of claim 6, wherein the state reduction unit operable to reduce the number of program states associated with the first module comprises a state reduction unit operable to abstract the program states associated with the first module.

10. The system of claim 9:

further comprising an interface coupled to the processor and operable to receive at least one abstraction parameter; and wherein the state reduction unit operable to abstract the program states associated with the first module comprises a state reduction unit operable to apply the at least one abstraction parameter when abstracting the program states associated with the first module.

11. Logic embodied in a computer readable medium, the computer readable medium comprising code operable to:

select from a target program comprising a plurality of modules a first module for evaluation;

isolate the first module; and iteratively perform the following logic until the first module has been reduced such that a validation program is able to determine whether the first module contains a defect:

generate an environment surrounding the first module, the generated environment preserving at least one external constraint on the first module;

reduce the size of the first module, wherein reducing the size of the first module comprises:

detecting an error in the target program;

identifying a portion of the first module that could cause the error; and slicing the first module so that at least one parameter not related to the portion of the first module that could cause the error is removed from the potentially faulty module; and reduce the number of program states associated with the first module.

12. The medium of claim 11, wherein the code operable to select from the target program comprising a plurality of modules a first module to be evaluated comprises code operable to:

run the target program;

detect at least one error during the running of the program, the at least one error caused by a defect in one or more modules of the plurality of modules;

identify the one or more modules of the plurality of modules that could cause the at least one error; and select a first module from among the one or more modules that could cause the at least one error.

13. The medium of claim 11, wherein the validation program comprises a model checker.

14. The medium of claim 11, wherein the code operable to reduce the number of program states associated with the first module comprises code operable to abstract the program states associated with the first module.

15. The medium of claim 14:

wherein the code is further operable to receive at least one abstraction parameter; and wherein the code operable to abstract the program states associated with the first module comprises code operable to apply the at least one abstraction parameter when abstracting the program states associated with the first module.

16. A system for detecting software defects, comprising:

means for selecting from a target program comprising a plurality of modules a first module for evaluation;

means for isolating the first module; and means for iteratively performing the following steps until the first module has been reduced such that a validation program is able to determine whether the first module contains a defect:

generating an environment surrounding the first module, the generated environment preserving at least one external constraint on the first module;

reducing the size of the first module, wherein reducing the size of the first module comprises:

detecting an error in the target program;

identifying a portion of the first module that could cause the error; and slicing the first module so that at least one parameter not related to the portion of the first module that could cause the error is removed from the potentially faulty module; and reducing the number of program states associated with the first module.

* * * * *